A. B. COLLETTE.
GAGE SPRING.
APPLICATION FILED MAY 19, 1915.
1,238,109.
Patented Aug. 28, 1917.
2 SHEETS—SHEET 1.
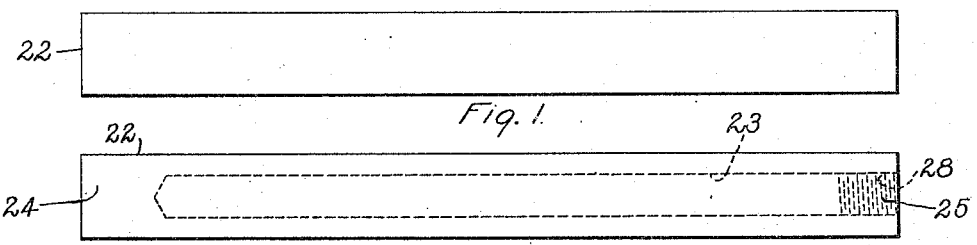
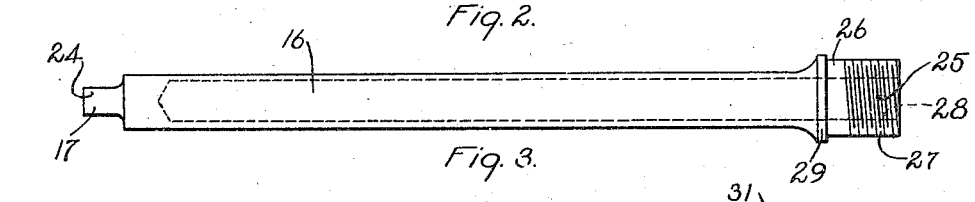
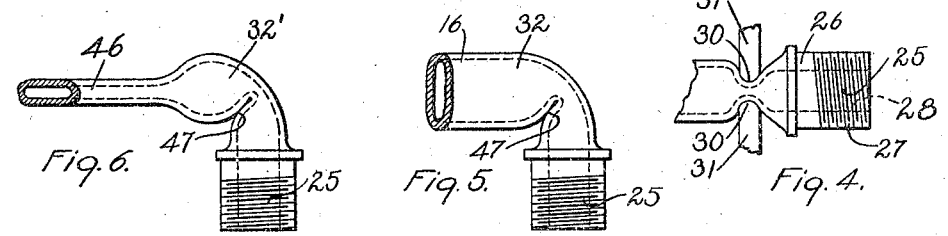
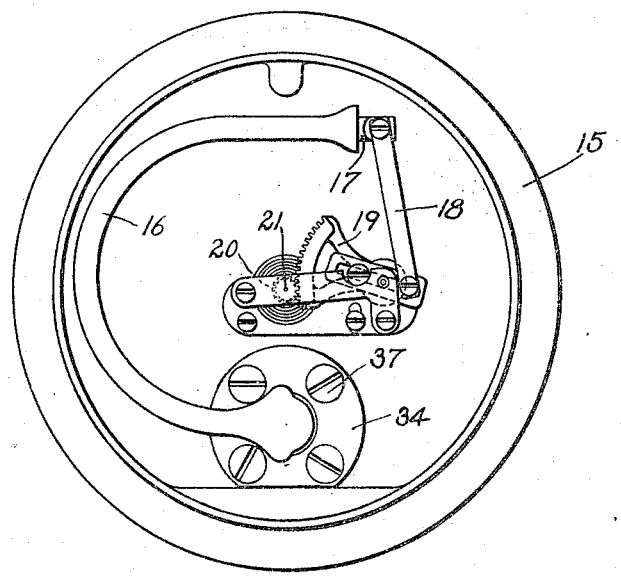
Fig. 7.
Witnesses
Herman R. Hoffman.
Leonard A. Powell.
Inventor
Austin B. Collette,
by his Attorney
Charles S. Gooding.

A. B. COLLETTE.
GAGE SPRING.
APPLICATION FILED MAY 19, 1915.

1,238,109.

Patented Aug. 28, 1917.
2 SHEETS—SHEET 2.

Witnesses
Herman R. Hoffman
Leonard A. Powell

Inventor
Austin B. Collette,
By his attorney

UNITED STATES PATENT OFFICE.

AUSTIN B. COLLETTE, OF EVERETT, MASSACHUSETTS, ASSIGNOR TO AMERICAN STEAM GAUGE & VALVE MANUFACTURING CO., A CORPORATION OF MASSACHUSETTS.

GAGE-SPRING.

1,238,109.  Specification of Letters Patent.  Patented Aug. 28, 1917.

Application filed May 19, 1915. Serial No. 29,203.

*To all whom it may concern:*

Be it known that I, AUSTIN B. COLLETTE, a citizen of the United States, residing at Everett, in the county of Middlesex and State of Massachusetts, have invented new and useful Improvements in Gage-Springs, of which the following is a specification.

This invention relates to improvements in springs for pressure or like gages and to the method of forming the same. The springs of this type, as at present constructed, comprise a tube, socket and tip, each made separately and all secured together in different ways such as by screwing, soldering or brazing. Said tube is furthermore flattened intermediate the ends thereof and bent in substantially semicircular form with a passage extending lengthwise through said socket and into the tube through which fluid, under pressure, may be admitted to expand the same and thereby tend to straighten said tube.

There are numerous disadvantages and objections associated with the type of spring hereinbefore referred to. First among which is the fact that the life of a spring tube, when the same has been subjected to medium or comparatively high pressure, is materially shortened by the acquiring of a permanent set particularly at the portion of the tube adjacent the juncture thereof with said socket. The threading of the end of the tube, which is attached to the socket, greatly weakens said end for at this point the greatest strain is naturally exerted by the fluid in changing the form thereof.

When the tubes of the springs are soldered to their sockets, a spring thus constructed is greatly limited in its use by reason of the fact that certain fluids, such for instance, as ammonia will attack and disintegrate said solder and permit said fluid to escape and thereby destroy the accuracy of the gage. Furthermore the ammonia or other fluids which leak from said tube will rust and destroy the mechanism of the gage and thus render it unfit for further use.

When the tubes are brazed to the socket, said tubes must be constructed of brass instead of steel for the reason that should steel be used the heat necessary for brazing destroys the temper of the steel, but as steel is far preferable to brass, the brazed type of spring is not commonly employed.

The object of this invention is to produce a spring in which the end of the tube, which is secured to the socket, is bent at an angle to the body of said tube, thereby relieving the portion of said tube which engages said socket from considerable pressure, due to the tendency of the fluid therein to change the form of said spring tube, and thus prolong the life of said spring and prevent the same from acquiring a permanent set.

Still another object of the invention is to provide a spring in which the spring and socket are constructed from a single piece of metal in order to eliminate the evils caused by screwing, soldering and brazing said parts together.

The invention consists in the combination and arrangement of parts set forth in the following specification and particularly as pointed out in the claims.

Referring to the drawings:

Figure 1 is a plan view of a metal rod from which my spring is constructed.

Fig. 2 illustrates said rod with a hole bored longitudinally thereof for a portion of its length and its bore threaded.

Fig. 3 shows the spring with the portion intermediate the ends thinned down and with the ends formed as hereinbefore described.

Fig. 4 is a side elevation partly broken away and illustrating the portion of the spring adjacent the bent end thereof being compressed or indented prior to having the open end portion bent at an angle to the tubular portion or body of the spring.

Fig. 5 is a side elevation, partly broken away and shown in section, illustrating the spring after it has been bent and flattened.

Fig. 6 is a side elevation, similar to Fig. 5, illustrating the spring bent and flattened for a portion of its length, the major diameter of said flattened portion being arranged at an angle to the major diameter of said bend, the remaining portion of the bent end of said spring being shown flattened substantially at right angles to said first mentioned flattened portion.

Fig. 7 is a front elevation of a gage casing with the dial removed and my improved spring attached thereto and connected to the mechanism for operating the gage hand.

Like numerals refer to like parts throughout the several views of the drawings.

Figure 9:
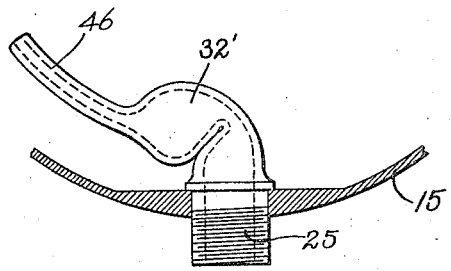
Fig. 9 is a sectional elevation illustrating a spring attached to the side of a gage casing.

In the drawings, 15 is a gage casing; 16 is the spring tube; 17 is the tip of the tube; 18 the link connecting the tip of the tube to a segmental lever 19 which meshes into a pinion 20, thus rotating the spindle 21 to which the gage hand, not shown in the drawings, is fastened. 22 is a cylindrical bar of metal (Fig. 1) from which the spring tube of the gage is formed.

The first step in the process of manufacture preferably consists in boring a hole 23 in the bar 22 longitudinally thereof and preferably extending partly therethrough, leaving a closed end 24 and an open end 25. The bar 22 is turned down intermediate the ends 24 and 25, which constitutes the body portion thereof, to form a thin tubular portion constituting the spring tube 16. The open end of this spring tube then terminates in a reinforced portion 26. This reinforced portion is slightly reduced in diameter and then screw-threaded upon its periphery at 27 and the bore of said end portion 26 is also provided with a screw-thread 28. The reduction of said end portion 25 is carried out for a portion only of the length thereof, the reduced portion of said end forming a flange 29 for the purpose hereinafter set forth. The opposite or closed end 24 of said tube is preferably formed by suitable instruments to provide the ear or tip 17 to which the link 18 may be conveniently attached.

Figure 13:
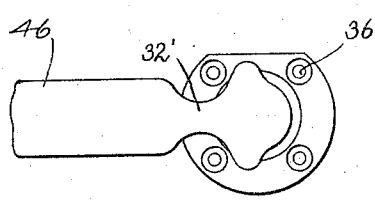
Fig. 13 is a plan view of the spring shown in Fig. 6 with a flange attached thereto.

The tube after being brought to the form illustrated in Fig. 3 and substantially filled with material adapted to prevent the collapsing or buckling thereof is indented or flattened on opposite sides thereof at 30 by suitable compressing tools 31. The end portion 25 is then bent at an angle, preferably an abrupt angle, to the tubular or body portion of the spring 16 by suitable tools and subsequently to this bending operation the tube 16 is flattened at 32 for a portion of the length of the body of said tube. This flattening may be done so that the major diameter of the flattened tube will lie substantially parallel with the axis of the end portion 25 and said flattened tube extend substantially the length of said body portion, as in Fig. 5, or said flattened portion may extend for only a portion of said tube, as at 32', see Figs. 6 and 13, while the remaining portion 46 of said tube may be flattened with its major diameter extending at right angles to the major diameter of the portion 32'.

The tube is then bent or curved along said flattened portion, preferably in a semicircular form. The indenting or flattening of the tube by means of the tools 31, 31 to produce the indentations 30 enables the tube to be bent at this portion without stretching the stock of the tube when the end portion 25 is bent at an angle to the main body portion of the tube and also enables the tube to be bent at a short or abrupt angle relatively to said end portion in order that the same may be made in compact form to be placed in the gage casing and to provide a tube which will not acquire a permanent set adjacent the part of said tube which is secured to the socket of the gage spring.

There are two ways in which gages constructed in accordance with that hereinbefore set forth may be mounted, one of said ways being to connect the fluid supply pipe through the back of the gage casing 15, while the other way is to connect said fluid supply pipe through the lower side of said casing.

Figure 8:
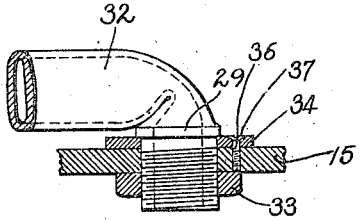
Fig. 8 is a sectional elevation illustrating the spring attached to the back of a gage casing.

When it is desired to connect said gage through the back, the socket or open end of the spring is arranged with its axis substantially at right angles to a plane containing the median axial line of the semicircular portion of said tube, as illustrated in Figs. 7 and 8. In this form of spring the flattened portion 32 extends substantially throughout the length of the body thereof.

When the gage is to be connected to the side or bottom of the casing, the socket or open end portion 25 thereof is arranged with its axis substantially in a plane containing the median axial line of said semicircular portion, as illustrated in the form shown in Fig. 9 in which form the flattened portion 32' extends only a short distance from the open end of the tube, the remaining portion thereof being arranged with its major diameter transverse to the axis of the socket 25.

To fasten either of said tubes to the casing the socket 25 thereof extends through a suitable hole provided either in the back or side of the casing and a nut 33 engages the screw-threaded portion 27 of the end 25 and clamps the spring as a whole to said casing.

Figure 10:
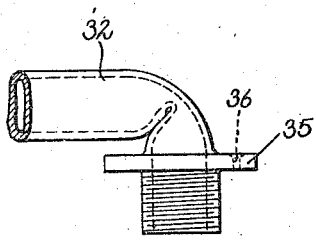
Fig. 10 is a side elevation, partly broken away, illustrating the socket end of a spring with a flange formed integral with said socket and the tube of said spring.

To prevent the rocking of the spring tube 16 about the axis of the screw-threaded portion 27 a collar 34 is provided which collar may be formed separately and shrunk upon the reinforced portion of the tube against the flange 29, as illustrated in Fig. 8, or if desired, said flange may be formed integral with said spring tube in place of the flange 29, as illustrated at 35, Fig. 10, in which latter case the bar 22 must be larger in diameter to start with and considerable metal removed therefrom to form the spring tube 16.

The collars 34 and 35 are provided with holes as at 36, see Figs. 7 and 8, and adapted to receive screws 37, which screws extend through said collar and into the casing.

It will be understood that by reason of the construction hereinbefore referred to the thickness of the tube 16 may be varied according to the pressure which is to be brought to bear upon it.

Figure 11:
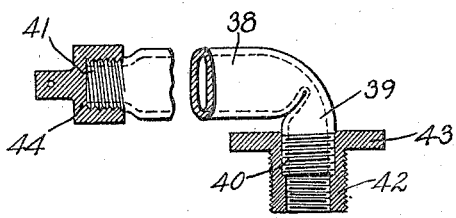
Fig. 11 is a sectional elevation of a spring illustrating the socket, spring and tip formed separately and secured together, the socket shown therein being constructed to be attached to the back of the gage casing.

In Fig. 11 is illustrated a spring tube 38 having one end 39 bent at an angle to the body of the tube 38. In this form of spring, the spring tube may be constructed from a piece of tubing of the desired thickness and threaded at opposite ends, as at 40 and 41. The bent end 39 of this form of tube at which the threads 40 are located has screw-threaded engagement with a socket 42 upon which a flange 43 is preferably formed, while the opposite end of said tube is supplied with a cap 44 constituting a tip and entirely closing said end.

Figure 12:
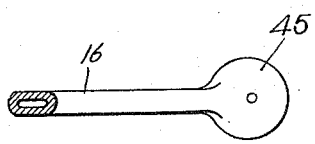
Fig. 12 is a side elevation of a portion of the end of a spring illustrating a tip formed by flattening the end of the tube constituting said spring.

The preferred method of forming the tip for the gage spring, as has been hereinbefore stated, is that shown in Fig. 3 in which form the tube is bored for a portion only of its length. It is not the intention however to limit the construction of this end of the tube to the form mentioned for it may, if desired, be constructed by boring said hole the entire length of the tube and then threading the end and applying the tip as in Fig. 11, or if desired, said tube may be flattened at the tip end, as illustrated in Fig. 12 and thus provide a tip 45 to which the link 18 may be attached.

In the form shown in Figs. 5 and 6 the flattened portions 32 and 32′ are preferably arranged to contact at 47, 47 with the walls of the end portion 25 in order to assist in supporting and stiffening the curved portion of the tube.

The operation of the instrument as a whole is well understood by those skilled in the art and briefly stated is as follows: Fluid, under pressure, enters the tube 16 through the bore of the socket or open end 25 and the pressure of said fluid causes the tip end of the tube to move outwardly from the axis of said socket, thus actuating the segmental lever 19, which in turn revolves the hand of the gage about the dial. When the amount of pressure is reduced the free end of the tube moves inwardly and reverses the motion of the hand so that it will indicate a less pressure upon said dial. In providing a spring having a spring tube with its stationary end bent at an angle and contacting with the body portion of said tube, the action of said spring will be much more resilient, permitting the same to withstand a much greater pressure, without acquiring a permanent set, than would be possible with a spring of the same dimensions, but constructed from a tube which is flattened and connected directly with the socket. Furthermore a gage spring including a tip, tube and socket constructed from a single piece of material with all of said parts integral will eliminate substantially all of the disadvantages recited against tubes as at present constructed and said springs may be constructed of the most approved and best grade of metal or steel known to the art.

Having thus described my invention what I claim and desire by Letters Patent to secure is:

1. A gage spring embodying in its construction a curved tube provided with an indentation disposed transversely thereof adjacent to one end of said tube, the tube being bent at said indentation so that the portion between said indentation and the end near which said indentation is located is at an abrupt angle to the portion of said tube upon the opposite side of said indentation and immediately adjacent thereto, the end of said tube adjacent the bend constituting means adapted to be attached to a gage casing.

2. A gage spring embodying in its construction a curved tube provided with an indentation disposed transversely thereacross adjacent to one end of said tube, the tube being bent at said indentation so that the portion between said indentation and the end near which said indentation is located is at an angle to the portion of said tube upon the opposite side of said indentation and immediately adjacent thereto, the end of said tube adjacent the bend constituting means adapted to be attached to a gage casing, a portion of the tube upon the opposite side of said indentation from said end being flattened at right angles to said indentation so as to engage a portion of the wall of said end.

3. A gage spring embodying in its construction a socket, and a tube formed integral with said socket, said tube being indented transversely thereacross adjacent to said socket and bent at said indentation at an angle to said socket, said tube having a flattened section adjacent to said indentation adapted to reinforce the portion of said tube adjacent to said indentation, the major diameter of said flattened section being disposed substantially at right angles to the major diameter of said tube at said indentation, said tube being also flattened and curved from the aforesaid flattened section for the greater portion of its length, the major diameter of said flattened and curved portion being disposed substantially at right angles to the major diameter of said aforesaid flattened section.

In testimony whereof I have hereunto set my hand in presence of two subscribing witnesses.

AUSTIN B. COLLETTE.

Witnesses:
 FRANKLIN E. LOW,
 SYDNEY E. TAFT.

Copies of this patent may be obtained for five cents each, by addressing the "Commissioner of Patents, Washington, D. C."